United States Patent [19]

Cusic

[11] Patent Number: 5,141,186
[45] Date of Patent: Aug. 25, 1992

[54] PIPE CLAMP

[75] Inventor: George W. Cusic, Lexington Park, Md.

[73] Assignee: Cusic Industries, Inc., Upper Marlboro, Md.

[21] Appl. No.: 730,430

[22] Filed: Jul. 16, 1991

[51] Int. Cl.$^5$ .............................................. F16L 3/00
[52] U.S. Cl. ................................. 248/73; 24/279; 248/68.1
[58] Field of Search .............. 248/73, 74.1, 74.2, 248/316.1, 68.1; 24/279, 278

[56] References Cited

U.S. PATENT DOCUMENTS

| 2,402,710 | 6/1946 | Tinnerman | 24/279 |
| 2,863,203 | 12/1958 | Dalpiaz | 24/279 |
| 3,066,903 | 12/1962 | Tinnerman | 248/74.1 X |
| 3,167,286 | 1/1965 | Sherburne | 24/279 X |
| 3,226,069 | 12/1965 | Clarke | 248/73 |
| 3,370,815 | 2/1968 | Opperthauser | 248/74.2 |
| 4,516,296 | 5/1985 | Sherman | 248/68.1 X |

Primary Examiner—Ramon O. Ramirez
Attorney, Agent, or Firm—Sughrue, Mion, Zinn Macpeak & Seas

[57] ABSTRACT

A pair of complementary pipe clamping straps clamp a pipe therebetween against an elongated supporting element. Each strap includes integrally inner and outer end portions and a central portion therebetween. The inner end portions of the strap are engageable with the supporting element, with the straps extending outwardly of the supporting element on opposite sides of the pipe, with the central portions of the straps wrapped about the pipe. The opposed straps define a central plane extending perpendicularly to the support element. The end portions of the strap are bent generally radially outwardly of the central portions and extend generally radially outwardly of the periphery of the pipe, coplanar and facing each other. One strap is of a length such that the central portion of the strap wraps about the pipe, with the outer end portion positioned in the vicinity of the center plane. The other strap is shorter such that the outer end portion thereof is laterally offset from the center plane. A manipulable fastener, such as a bolt and nut, extends obliquely to the center plane and laterally offset from the center plane to the side of the elongated support element, to which the shorter length strap is connected.

7 Claims, 1 Drawing Sheet

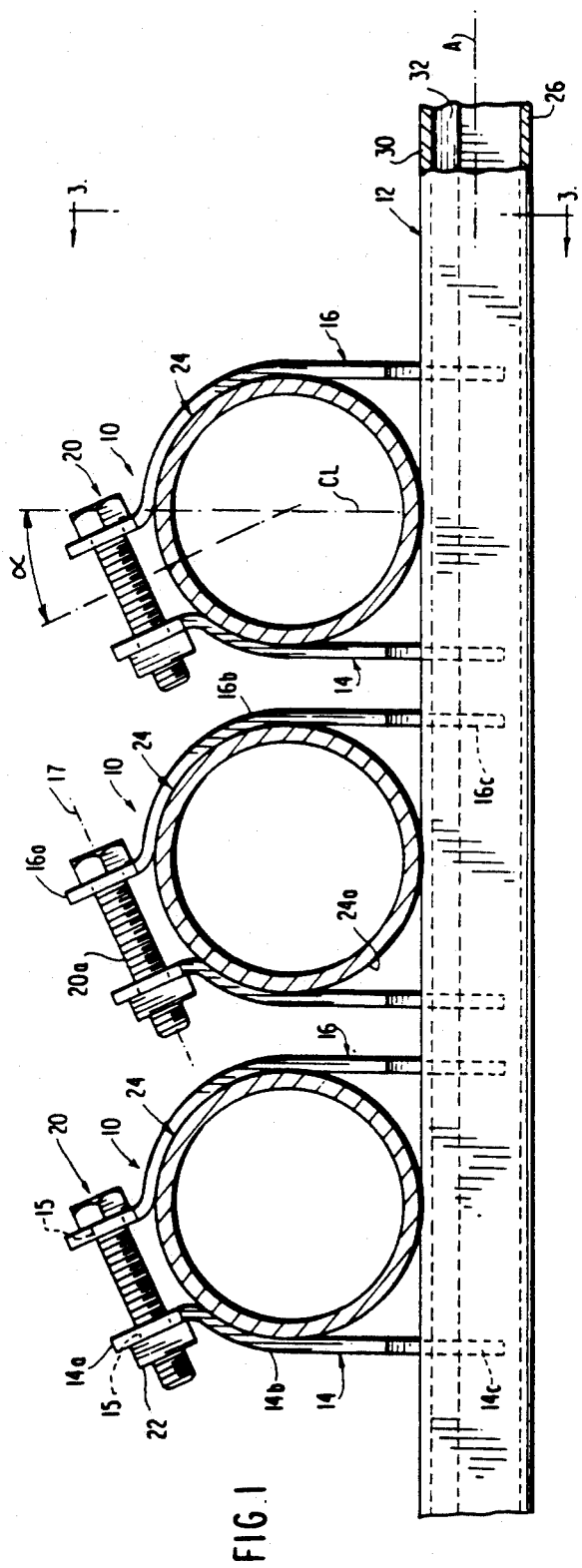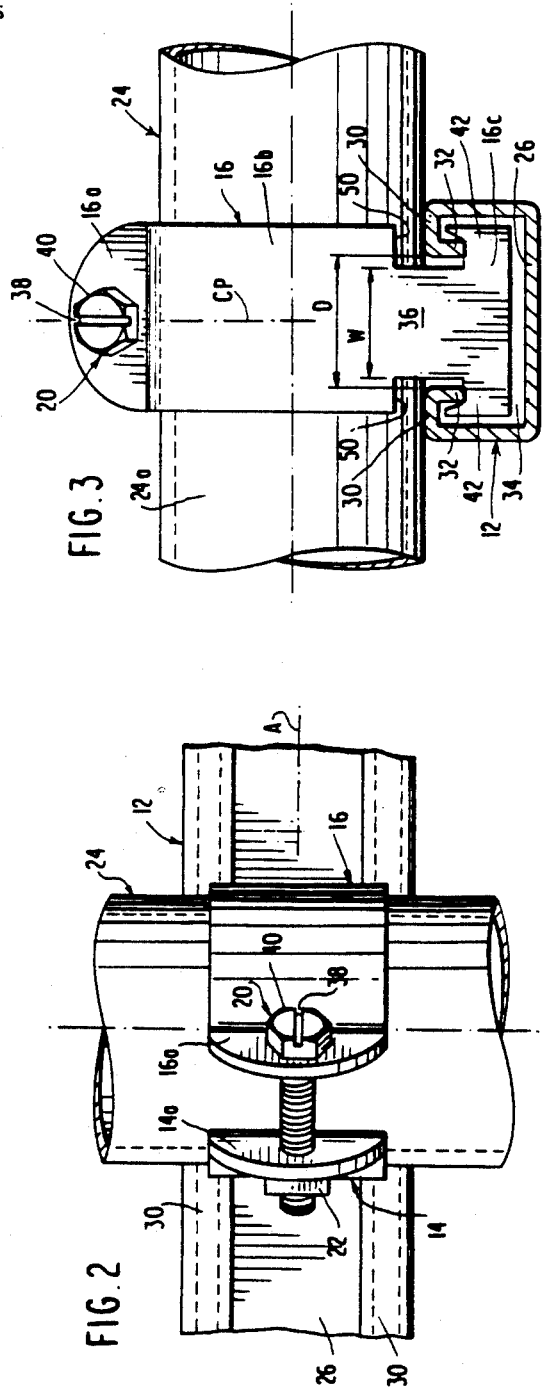

PIPE CLAMP

FIELD OF THE INVENTION

This invention relates to the pipe clamps for clamping a pipe to structural supporting elements, such as a channel member, and more particularly to pipe clamps formed by a pair of metal straps coupled about the supporting element at one end and being wrapped partially about the periphery of the pipe and joined by a screw or wrench operated manipulable fastener, which extends through aligned holes within the ends of the straps.

BACKGROUND OF THE INVENTION

Conventional pipe clamps of this type are typically supported within an elongated, upwardly open channel member having side walls with right angle flanges, extending towards each other. Metal straps which each include inner and outer end portions and a central portion therebetween, employ inner end portions having projecting feet to opposite sides which reside within the interior of the channel member and underly the laterally opposed, facing flanges. Thus, the inner end portions of the straps are typically configured for locking into the channel member with the central portion of the straps extending outwardly therefrom. The straps are either flexibly wrapped about a portion of the periphery of the pipe, while facing each other, or bent or curved to adapt to the surface configuration of the pipes. Typically, the straps are identical and, terminate in outer end portions which extend radially beyond the pipe crossing the channel member normally at right angles, and in which the outer ends of the straps have holes within the center of the same. The holes are aligned, and typically receive a headed bolt with the shank of the bolt passing through the aligned slots and have a nut threaded to the threaded end of the shank. Whereupon, by means of a screwdriver, a wrench, or the like. A bolt is threaded into the nut, and tightened down, tightening the straps about the periphery of the pipe and holding the pipe in contact with the underlying supporting channel member. Such pipe clamps are exemplified by U.S. Pat. Nos. 2,375,513; 2,846,169; 3,417,951; 3,527,432; 3,145,962; 4,044,428; and 4,516,296.

Wherein, the channel member is crossed by a series of parallel, closely spaced pipes, with pipe clamps holding each of the pipes in contact with the underlying common channel member, it is quite difficult, if not impossible to tighten the bolt of one clamp, because of the interference of an aligned bolt of the adjacent clamp. Typically, the bolts or screws are in horizontal alignment and centered on the top of the pipe, with the axis of the bolts or clamps extending parallel to the longitudinal axis of the underlying support channel member.

Such problem caused by multiple, closely positioned pipe clamps is illustrated in FIG. 1 of yet a further U.S. Pat. No. 4,757,965. That patent is directed to a modified pipe clamp, utilizing a pair of complementary clamping straps of identical length. However, the straps terminate in outer end portions which while facing each other, are twisted relative to the central portions of the straps, so that, instead of the axis of the bolts of plural used for tightening the straps being axially aligned, the clamps bolt axes are skewed obliquely relative to the longitudinal axis of the underlying channel member, with the ends of the bolts accessible to tools held oblique to the axis of the channel member.

While such pipe clamps of U.S. Pat. No. 4,757,965 solve the same problem facing the Applicant in this case, it is not always possible to have access to the pipe clamps from the side of the channel member and, the pipe clamp is complicated by the requirement to twist the upper ends of the clamping straps relative to their central portions by an angle of approximately 45°.

It is therefore, an object of the invention to provide an easy to use clamp assembly of two clamp halves, which permit a plurality of assemblies to be mounted commonly to an underlying support such as an upright open channel member in side-by-side fashion and which permits selective tightening and untightening of the clamps without interference by the presence of the other clamps.

It is a further object of the invention to provide such a two-piece pipe clamp which eliminates the necessity for twisting outer end portions of the clamp strap halves, which is of a simplified, low cost nature and which permits the location of the manipulable fastener means of the clamp assembly to be varied in its position relative to the periphery of the pipe being clamped.

SUMMARY OF THE INVENTION

The invention is directed to a pipe clamp for clamping a pipe to an elongated support element having a central longitudinal axis. The clamp is comprised of a pair of complementary clamping straps adapted to clamp the pipe therebetween onto the elongated supporting element. Each strap has integrally, inner and outer end portions and a central portion therebetween. The inner end portion of the straps is engageable with the supporting element in a position where the straps extend outwardly of the supporting element on respective opposite sides of the pipe, with the central portion of the straps disposed in face-to-face relation with the pipe and defining a center plane of the straps which is generally perpendicular to the elongated supporting element. Manipulable fastener means are located at the outer end portions of the clamping straps for drawing the outer end portions toward each other to clamp the pipe against the underlying elongated support element. The improvement resides in one of the straps being sufficiently long to cause the outer end portion of the back strap to locate generally in close vicinity of the center plane of the straps. The other of the straps is sufficiently short to cause the outer end portion thereof to extend from the periphery of the pipe at a position substantially remote from the center plane of the straps, such that the fastening means lies oblique to the center plane, laterally offset to the side of the elongated supporting element to which the shorter length strap is connected.

Preferably, the end portions of the straps are bent radially outwardly of the strap central portion such that the end portions are coplanar and oblique to the central plane of the straps. The straps may be flexible so as to curve about the sides of the pipe and lie in contact therewith, or the strap may be relatively ridged and have a curvature over the central portion matching that of the periphery of the pipe. The end portions of the straps preferably have aligned holes to receive a bolt and nut constituting one form of the manipulable fastener means.

Preferably, the elongated supporting element constitutes an elongated upwardly open channel member having a bottom wall, right angle upwardly directed side walls, which terminate sidewalls with the right angle laterally facing flanges inwardly directed lips. The inner ends of each said straps has a width which is narrower than the distance between the lips of the channel member. The inner end of the straps have oppositely, outwardly directed feet which project within the channel member, towards the opposite upright end walls. The inner end portion of the strap is wider than the opening within the upwardly open channel member such that the feet hook onto the lips of the channel member and act as interlocks between the straps and the channel member upon tightening down of the manipulable fastener means coupling the outer end portions of said straps.

The pipe clamp and the elongated supporting element preferably form a structural combination and, the elongated supporting element preferably comprises an elongated upwardly open generally u-shaped channel member with integral lips projecting inwardly of the flanges and, a plurality of pairs of complementary clamping straps are mounted side by side within the channel member.

DESCRIPTION OF THE DRAWINGS

FIG. 1 is a front elevational view of a plurality of side-by-side pipe clamps clamping a plurality of pipes at right angles to an upright upwardly open channel member;

FIG. 2 is a top plan view of one of the pipe clamps of the assembly of FIG. 1.

FIG. 3 is a vertical sectional view of the clamp of FIG. 1 taken about line 3—3.

Corresponding reference characters indicate corresponding parts throughout the several views of the drawings.

DESCRIPTION OF A PREFERRED EMBODIMENT

Referring to the drawings, a pipe clamp of the present invention forming a preferred embodiment of the invention is indicated generally by reference 10 in the drawings. The invention is particularly directed to the use of the plurality of such clamps 10, FIG. 3, which are mounted side-by-side and coupled to a underlying, elongated structural supporting element indicated generally at 12 and which is preferably constituted by an upwardly open channel member.

As shown best in FIGS. 2 and 3, the channel member 12 has a central longitudinal axis A and comprises a base 26 and a pair of generally laterally opposed sides 9 extending outwardly (upwardly in FIGS. 1 and 2) from the base. A pair of integral, opposing inwardly directed flanges 30 extend from the sides towards each other, and terminate in integral, downwardly directed lips 32 of short vertical height. As used herein, "inwardly" and "outwardly" mean downwardly and upwardly, respectively in FIGS. 1 and 2, and "laterally inwardly and outwardly" mean horizontally inwardly or outwardly with respect to a vertical center-plane CP through the clamp in FIGS. 1, 2 and 3. In FIGS. 2 and 3, the center-plane CP is clearly shown at right angles to the axis of a pipe 24 captured thereby and passing therethrough.

Each clamp 10 generally comprises a pair of complementary but not identical clamping straps 14, 16, the clamping straps have identical width and are formed of three portions or sections. However, one clamp 14 is of much shorter overall length than the other 16 and wraps to a lesser degree about the periphery 24a of pipe 24 than does the complementary strap 16. The short length strap 14 has an outer end portion 14a, a central or intermediate portion 14b, and an inner end portion 14c. Likewise, the long length strap 16 has an outer end portion 16a, a central or intermediate portion 16b, and an inner end portion 16c.

The shape, width and length of the inner end portions 14c and 16c of straps 14 and 16, respectively, are identical and, the width, length (height) of the outer end portions 14a and 16a of straps 14 and 16 are also identical. Further, each of the outer end portions of each of the straps as 14a, 16a are provided with a laterally central, circular hole 15 which are of similar size, and which are in axial alignment when the pipe straps 14, 16 are assembled to the channel 12 and are positioned on respective sides of a pipe 24 as per FIG. 1.

As seen in FIG. 3, the inner end 16c which is identically shaped and configured to that of 14c for strap 14 in each of the clamps, comprises a flat stem 36 of reduced width W extending inwardly into cavity 34 of channel member 12 from the central portion 16b of that strap. A pair of hooked-shaped feet 42 extend laterally outwardly from the inner or lower end of the stem 36. The width W/V of stem 36 is preferably slightly narrower than the lateral distance D between the opposing lips 32 of the channel member 12. The feet 42 are hooked in an upward direction towards the central portion 16b of strap 16. The same configuration sizing and narrowing of the strap 16 takes place as occurs for strap 14, including cutouts in each side as at 50 to produce the flat stem 36 as per strap 16, FIG. 3. The hooking of feet 42, in the direction of the central portion 16b of strap 16 causes the strap 16 to hook onto lips 32 to thereby fixedly mount the strap on the channel member under the compression force created by bolt 20 and nut 22 when the bolt is tightened down on nut 22 by an appropriate tool, such as a screwdriver whose tip is positioned within slot 38 of the headed end 40 of bolt 20. The same structure and effect is applied to the short length strap 14.

As may be appreciated by viewing FIGS. 1, 2 and 3, the central portion 16b of strap 16 is bowed or curved in excess of 90° about the periphery 24a of pipe 24 with that curvature given to the central strap portion 16b complementing the circular curvature of the cylindrical pipe 24. Further, the overall length of the strap 16 which is longer than the short strap 14, and is such that the radially projecting outer end portion 16a of strap 16 lie beyond the center line CL, with outer end portion being on the left side of the pipe in FIG. 1 for each of the clamps 10. Correspondingly, a similar curvature or bowing is provided to the central portion 14b of the short length strap 14, in this case over only approximately 45°. Outer end portion 14a is generally radially directed outwardly of the bowed central portion 14b of strap 14 and extending obliquely, parallel to that of outer end portion 16a to long length strap 16. With the sizing of the outer end portions 14a, 16a of the short length and long length straps 14 and 16, the circular holes 15 within these outer end portions are aligned, and the common axis 17 for these holes is oblique to the center line CL of the pipe clamp such that the plane passing at right angles through the axis of the bolt 20 is at an angle α of approximately 25° obliquely to the left of the center line. It should be appreciated that, as per FIG. 1, the slot 28 within the head 40 of the bolt 20 faces upwardly and outwardly for easy access by the leading edge of a screwdriver or like tool aligned with the bolt head slot 28, attempting to tighten or loosen the clamp 10. Such action is no way effected by the immediately adjacent clamp 10 to the right, FIG. 1 and this arrangement acts similarly for all of the clamps 10 in the series (three being illustrated). That oblique angulation may vary from 5° to 60° or more, depending upon the overall lengths of respective complementary straps 14, 16 causing the manipulable fastener means, i.e., bolt 20 and nut 20, complementary nut 22 on threaded shank 20a of the bolt to vary circumferentially in position depending upon the accessibility of the space immediately surrounding the pipe clamp at a given pipe 24 location relative to the underlying support channel member 12.

Alternatively, the hole 15 within the strap 14, remote from the head 40 of the bolt 20 may be threaded and, the threaded shank 20a of the bolt may matingly engage the threads at the hole 15 through the strap outer end portion 19a, thus dispensing with the need for a nut 22. Further, nut 22 may be a lock nut or a conventional nut in which case, appropriately a washer (not shown) may be positioned on threaded shank 20a, intermediate of the nut 22 and the outer end 14a of the short length strap 14.

For each pipe 24, the straps 14, 16 are mounted on the upwardly open channel member 12 by inserting each inner end portion of 14c, 16c of the respective facing straps with the plane of the lower end portions, generally parallel to the central longitudinal axis A of the channel member. Thereafter, by turning the respective straps until the plane of the inner end portions thereof is generally perpendicular to the central longitudinal axis A of the channel, the feet 42 engage, respectively, the inwardly extending lips 32. The straps are in a position where the central portions 14b, 16b extend outwardly of the channel member 12, adjacent opposite sides of the pipe 24, respectively and with the upwardly and outwardly oblique near radial positions of the outer ends 14a, 16a of straps 14, 16 extending parallel to each other and spaced apart. The bolt 20 is then positioned such that the shank 20a passes through aligned hole 15 within the strap ends 14a, 16a and then nut 22 loosely threaded onto the shank 20a on the outside of the outer end 14a of strap 14. By holding the nut 22 stationary, and rotating the bolt 20 by a screw driver tip inserted within slot 28 of the bolt head 40, the pipe may be clamped between the straps and secured to the top of the upwardly open channel member 12.

An assembly of multiple pipes 24 and a like member of clamps 10 are effected and the clamps 10 tightened down in side-by-side fashion, one after another, without interference by normal horizontal in-line positioning of all of the bolts or screws or other manipulable fastener means with easy tool access to the individual manipulable fastener means formed by the bolts 20 and nuts 22 or their equivalent. As may be appreciated, the present invention permits the clamps 10 to actually abut each other. Thus, an even closer positioning of the laterally spaced, parallel pipes 24 as per FIG. 1.

From the above, the objects discussed are readily achieved and in a simplified and low cost structure.

Various changes and modifications may be made to the construction as illustrated and described without departing from the scope of the invention and it is intended, that the description above and the accompanying drawings are to be interpreted as illustrative only and not in a limiting sense.

What is claimed is:

1. In a clamp for clamping a pipe to an elongated support element, having a central longitudinal axis comprising:
   a pair of complementary clamping straps adapted to clamp the pipe therebetween on said elongated supporting element, each strap having integrally, inner and outer end portions and a central portion therebetween,
   the inner end portions of the straps being engageable with the supporting element in a position where said straps extend outwardly of the supporting element on opposite sides of the pipe with the central portions of the straps disposed in face to face relation with the pipe and defining therebetween the central plane of said straps, which plane is generally perpendicular to said elongated support element, and
   manipulable fastener means coupling the outer end portions of the clamping straps for drawing the outer end portions towards each other and the central portions bearing tightly against the pipe, the improvement wherein;
   one of said straps constitutes a long length strap of a length such that the central portion of the strap wraps about the pipe with the outer end portion positioned in the vicinity of the center plane of the strap and the other of said straps being a short length strap whose length is such that the outer end portion thereof, is significantly remote from the center plane such that the manipulable fastener means joining the two strap outer end portions has an axis thereof oblique to the center plane and said manipulable fastener means is laterally offset from said center plane to the side of the elongated supporting element to which the short length strap is connected.

2. The pipe clamp as claimed in claim 1, wherein said end portions of said straps are bent generally radially outwardly of the central portions thereof, so as to extend generally radially outwardly of the periphery of the pipe with the end portions of respective straps being coplanar, facing each other, and oblique to the pipe clamp center plane at an angle in the range of 5° to 60°.

3. The pipe clamp as claimed in claim 3, wherein the central portions of said straps are curved concavely about the outer periphery of the pipe and in contact therewith, and wherein, said end portions of said straps carry holes therein, said holes being in axial alignment and wherein, said manipulable fastener means comprises a bolt having a shank extending through said aligned holes, and a nut threadedly engaging said shank.

4. A pipe clamp as claimed in claim 1, wherein the inner end portion of each strap comprises a stem of reduced width extending inwardly from the central portion thereof, and a pair of feet extending laterally outwardly from the stem, the feet being adapted to engage a pair of opposing inturned flanges on the supporting element for locking the straps to the elongated supporting element.

5. The clamp as set forth in claim 1, wherein the inner end portions of the straps are of the same size and configuration and wherein the outer end portions of each strap are of the same size and configurations length and wherein the central portions of the straps are of differing length.

6. In combination with an elongated supporting element and a pipe which extends transversely across the conduit generally at right angles thereto, an improved clamp for securing the pipe to the supporting element, said clamp comprising a pair of complementary clamping straps adapted to clamp the pipe therebetween on said elongated supporting element, each strap having integrally, inner and outer end portions and a central portion therebetween, the inner end portions of the straps being engageable with the supporting element in a position where said straps extend outwardly of the supporting element on opposite sides of the pipe with the central portions of the straps disposed in face to face relation with the pipe and defining therebetween the central plane of said straps, which plane is generally perpendicular to said elongated support element, and manipulable fastener means coupling the outer end portions of the clamping straps for drawing the outer end portions towards each other and the central portions bearing tightly against the pipe, the improvement wherein;

one of said straps constitutes a long length strap of a length such that the central portion of the strap wraps about the pipe with the outer end portion positioned in the vicinity of the center plane of the strap and the other of said straps being a short length strap whose length is such that the outer end portion thereof, is significantly remote from the center plane such that the manipulable fastener means joining the two strap outer end position has an axis thereof oblique to the center plane and is laterally offset to the side of the elongated supporting element to which the short length strap is connected.

7. The combination according to claim 6, wherein the inner end portions of the straps are generally of the same size and configuration, the outer end portions of the straps are generally of the same size and configuration, and wherein the central portion of the straps are of a different length, such that the outer ends of both straps lie on the same side of a vertical center plane formed by the dual strap clamping assembly, a bolt and nut fastener extends through aligned holes within the parallel outwardly oblique outer ends of the straps permitting tightening down of the nut on the bolt by a tool which is oblique to the center plane thereby preventing interference between identical clamps positioned in a side-by-side array commonly in the channel member.

* * * * *